US007702766B2

(12) United States Patent
Weir et al.

(10) Patent No.: US 7,702,766 B2
(45) Date of Patent: Apr. 20, 2010

(54) TESTING FRAMEWORK FOR COMMUNICATION IN A DISTRIBUTED ENVIRONMENT

(75) Inventors: James G. Weir, Grenoble (FR); Thomas J. L. Debru, Grenoble (FR)

(73) Assignee: Oracle America, Inc., Redwood Shores, CA (US)

( * ) Notice: Subject to any disclaimer, the term of this patent is extended or adjusted under 35 U.S.C. 154(b) by 1710 days.

(21) Appl. No.: 10/867,182

(22) Filed: Jun. 14, 2004

(65) Prior Publication Data

US 2005/0022194 A1      Jan. 27, 2005

(30) Foreign Application Priority Data

Jun. 13, 2003    (FR)    .................................... 03 07163

(51) Int. Cl.
G06F 15/173         (2006.01)
(52) U.S. Cl. .................................................... 709/223
(58) Field of Classification Search ................. 709/202, 709/204, 220–226; 358/1.15; 705/6, 1, 28, 705/26, 27, 56, 35, 37, 44, 10; 717/121, 717/126, 177, 101; 707/100, 10; 714/25–34
See application file for complete search history.

(56) References Cited

U.S. PATENT DOCUMENTS 5,421,004 A *   5/1995   Carpenter et al. ............. 714/25
5,544,310 A *   8/1996   Forman et al. ................ 714/31
2001/0016867 A1*  8/2001   Hu et al. ...................... 709/202

* cited by examiner

*Primary Examiner*—Nathan Flynn
*Assistant Examiner*—Mark O Afolabi
(74) *Attorney, Agent, or Firm*—Osha • Liang LLP

(57) ABSTRACT

The invention concerns a testing framework, comprising
a first computer system, adapted for communication with nodes in a distributed node environment,
first code, capable of creating a task manager,
second code adapted for defining tasks, including test tasks,
third code, capable of creating a task agent,
test related data,
a test launcher capable of interacting with said first code for starting a task manager in said first computer system, of delivering test related data to said task manager, and, upon the sending of the third code to remote nodes, capable of requesting the starting of one or more task agents on said remote nodes,
the task manager responding to the test related data for providing said one or more task agents with said test related data, said one or more task agents responding to said test related data for retrieving respective tasks available in the second code, said task manager being capable of thereafter monitoring the execution of such tasks.

22 Claims, 13 Drawing Sheets

| Scenario | Task Mgr | Node Mgr Instance | Task Agent instance | Task (instance) |
|---|---|---|---|---|
| 749. Receives Start state | 748. Updates db Look in db for conditions being now fulfilled, and start/stop tasks if required(741/751) Send Start state to scenario | 747. Updates db (if not user msg) Sends msg to TM | 746. Condition "STARTED" registered with time-out sends msg to NM | 745. Execute user defined task code (may include user defined condition notifications) |
|  | 751.Send notify stop task for each of these to the relevant NM instances | 752.Receives notify stop task forwards to task agent | 753. Receives notify stop task Sends to correct task | 754. Go to 755 |
| 759. Receives FINISHED state & results Update db | 758.Updates db Look in db for conditions being now fulfilled, and start/stop tasks if required(741/751) * Results : Sends as msg to scenario | 757. Updates db (if not user msg) Sends msg to TM * Results: Sends as msg to TM Delete task info from the db | 756.Condition "FINISHED" Cancels time-out Sends msg to NM * Results: Sends as msg to NM | 755-send : .notif msg "finished" .result msg HM_NotifyTaskResults - blocks HM_WaitForSignal() |
| 760.When received all results from all tasks, send "monitor STOP" to the scenario Cancel time-out, if any | | | | |
| 761.received monitor STOP return from HM_MonitorTasks | | | | |

FIG 9B

TESTING FRAMEWORK FOR COMMUNICATION IN A DISTRIBUTED ENVIRONMENT

BACKGROUND

The invention relates to the testing of applications or products, more particularly that run in a distributed environment.

A distributed environment comprises a group of interconnected machines, also called nodes, that share information and resources. Applications or products using such an environment have to be tested in order to simulate a controlled real functioning, to detect possible errors and to validate and verify such products or applications. To test these applications or products on a single machine, a test may be developed as known. Development and management of such a test is quite easy as it runs on a single machine and operating system.

On the contrary, developing a distributed test on such environment is becoming incrisingly difficult for the developer to manage and synchronize the various parts of the test that are running on the distributed environment. Moreover, the development of such a test in a distributed environment is made more difficult since machines in a distributed environment support different architectures, e.g. different operating systems, hardware and so on. Such difficulties limit the development of a complex test in distributed environment.

SUMMARY

The invention concerns a testing framework that comprises a first computer system adapted for communication with nodes in a distributed node environment, first code, capable of creating a task manager, second code, capable for defining tasks, including test tasks, third code, capable of creating a task agent, test related data, a test launcher capable of interacting with said first code for starting a task manager in said first computer system, of delivering test related data to said task manager, and, upon the sending of the third code to remote nodes, capable of requesting the starting of one or more task agents on said remote nodes, the task manager responding to the test related data for providing said one or more task agents with said test related data, said one or more task agents responding to said test related data for retrieving respective tasks available in the second code, said task manager being capable of thereafter monitoring the execution of such tasks.

The invention also concerns a testing method executable on a first computer system, adapted for communication with nodes in a distributed node environment, comprising:

a. creating in said first computer system a task manager, b. sending code for creation of task agent to remote nodes, and requesting the starting of one or more task agents on said remote nodes, c. delivering test related data to said task manager which provides said one or more task agents with said data, d. retrieving, by said one or more task agents, respective tasks responsive to said test related data, and e. monitoring the execution of such tasks.

Other features will be found in the claims appended to this specification.

DESCRIPTION OF THE DRAWINGS

Still other features and advantages of the invention will appear in the light of the detailed description below and the associated drawings in which:

FIG. 9B is the continuation of the flow chart of FIG. 9A;

SPECIFICATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright and/or author's rights whatsoever.

Additionally, the detailed description is supplemented with the following Exhibit:

Exhibit A contains specific API functions,

Exhibit B contains code example for tasks and task scenario process according to the invention.

These Exhibits are placed apart for the purpose of clarifying the detailed description, and of enabling easier reference. They nevertheless form an integral part of the description of embodiments of the present invention. This applies to the drawings as well.

Figure 1:
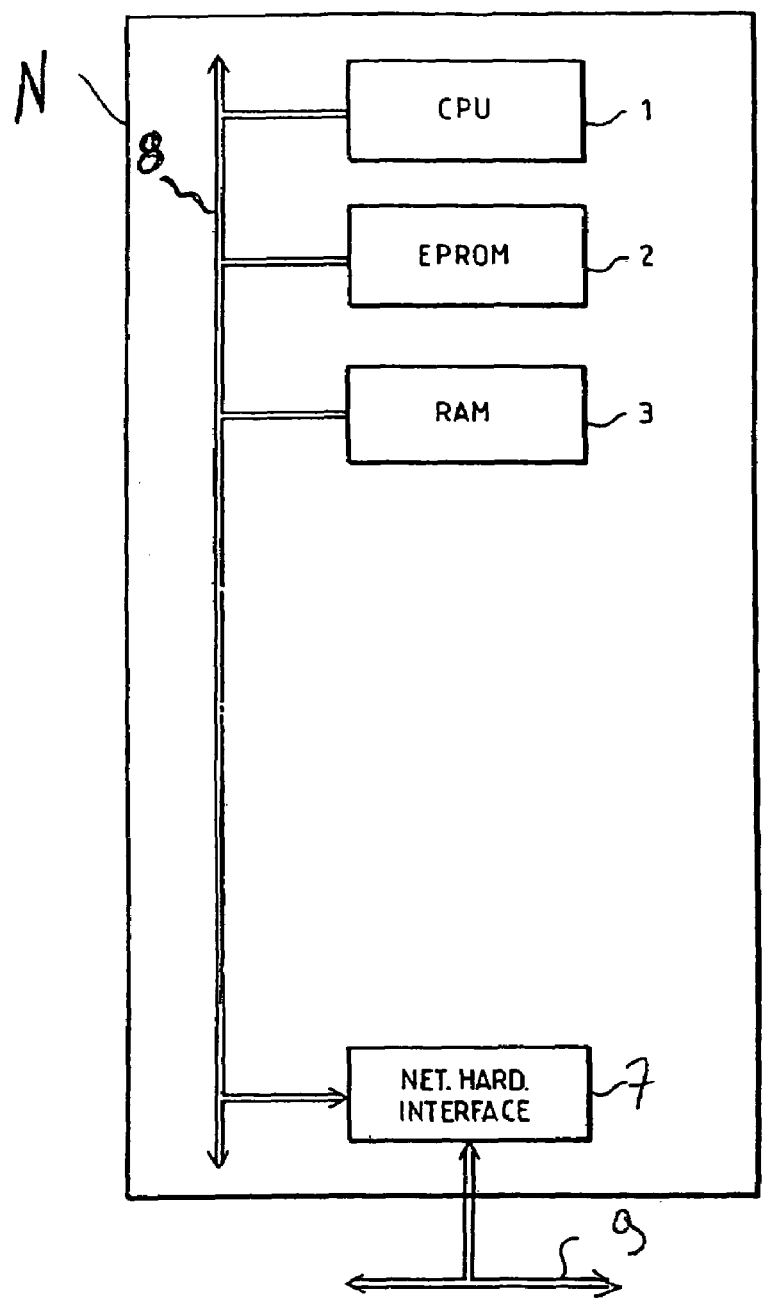
FIG. 1 is a general diagram of a node in a distributed computer system.

Embodiments of this invention may be implemented in a network comprising computer systems, also called machines or nodes. The hardware of such computer systems is for example as shown in FIG. 1, where in the computer system N:

1 is a processor;

2 is a program memory, e.g. an EPROM for BIOS;

3 is a working memory, e.g. a RAM of any suitable technology (SDRAM, SRAM, RAM EDO or DRAM for example); and 7 is a network interface device connected to a communication medium 9, itself in communication with other computers. Network interface device 7 may be an Ethernet device, a serial line device, or an ATM device, inter alia. Medium 9 may be based on wire cables, fiber optics, or wireless-communications, for example.

Data may be exchanged between the components of FIG. 1 through a bus system 8, schematically shown as a single bus for simplification of the drawing. As known, bus systems may often include a processor bus, e.g. of the PCI type, connected via appropriate bridges to e.g. an ISA bus and/or an SCSI bus.

A group of such interconnected machines defines a distributed environment and such machines share information and resources. Applications, products running on such distributed environment have to be tested in order to simulate a controlled real functioning, to detect possible errors, to validate and verify the applications or products work correctly.

Developing a complex test for such distributed applications or products running on these interconnected machines implies management and synchronization of the various parts of the test that are running on different machines. Moreover, the management of such a test in a distributed environment is that much difficult since machines in a distributed environment support different architectures, e.g. different operating systems and/or hardware. The retrieval and the analysis of results of such a test are also becoming incrisingly complex in a distributed environment. Such difficulties limit the development of complex tests in distributed environment.

Figure 2:
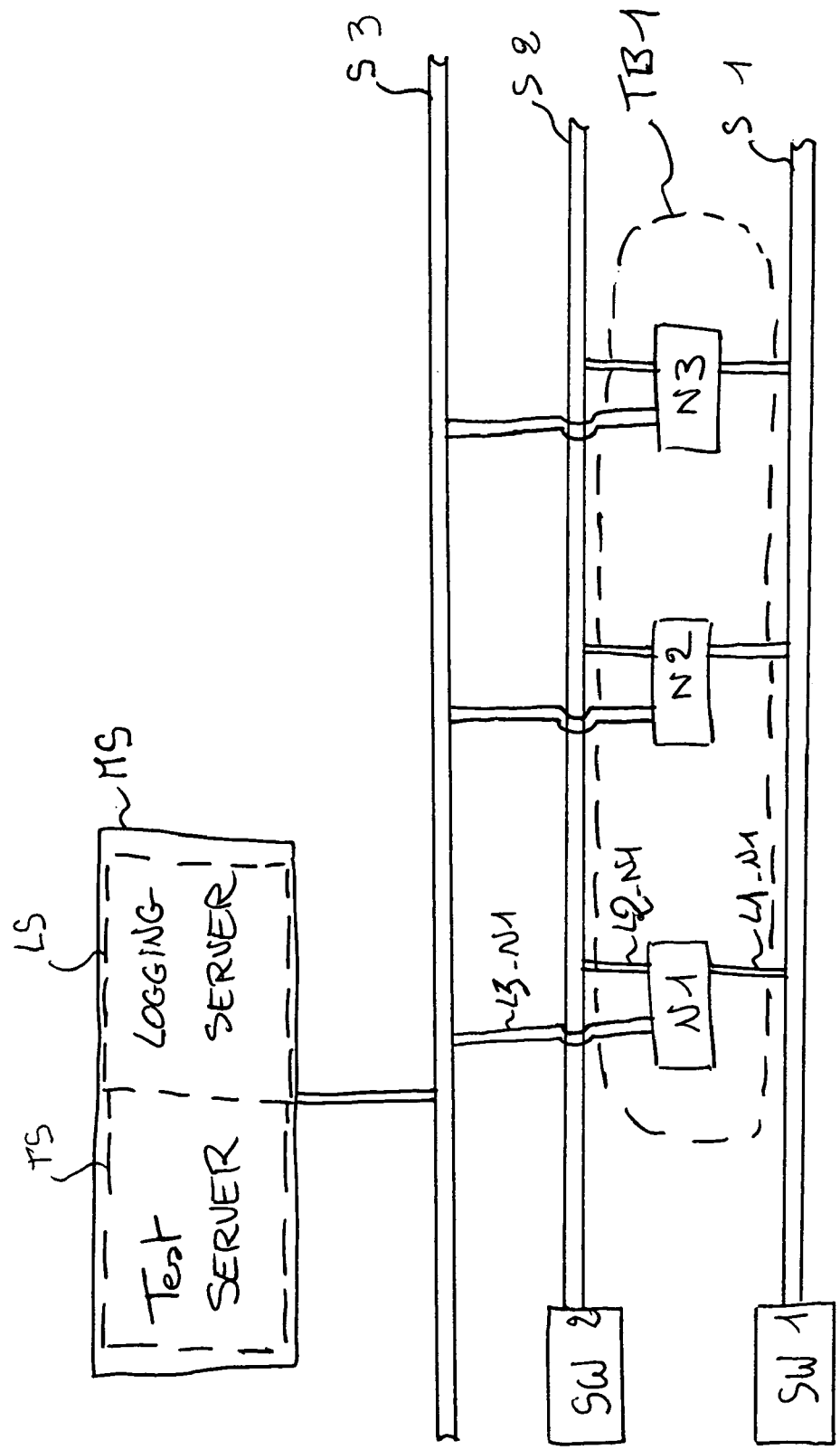
FIG. 2 is a general diagram representing the main server of the invention connected to a distributed environment to test according to the invention.

In the following description, a computer system or machine is called node for generalization. FIG. 2 shows a distributed environment comprising an exemplary group of nodes as described in FIG. 1 and a main server according to the invention. An index i is an integer used for example for the designation Ni of a node i. An index j is an integer used for example for the designation the switch SWj managing a subnet Sj.

Each node Ni, e.g. N1, N2 and N3 in FIG. 2, uses a physical link Lj-Ni, e.g. L1-N1, L1-N2 and L1-N3 in FIG. 2, to be connected to a first communication medium called subnet S1. This subnet S1 is managed by a switch SW1 in order to establish a communication between nodes Ni. For redundancy and security reasons, each node Ni may also use a physical link L2-Ni to be connected to a second communication medium called subnet S2. This subnet S2 is managed by a switch SW2 in order to establish a communication between nodes.

A main server MS may be linked to each node using at least one of the physical links. FIG. 2 shows another embodiment in case a test requires that all available physical links have to be connected to provide isolated subnets. For example in this case and other cases, it is foreseen that the main server MS is linked to a subnet S3 and each node Ni is linked to this subnet via a logical link L3-Ni. A logical network interface is created on one of the physical network interfaces of each node. Nodes Ni of FIG. 2 represent a first group of nodes TB1, TB1 meaning first Test Bed. The expression Test Bed designates the group of nodes on which various parts of a test may be executed via management of the main server as described hereinafter. Other nodes of other groups (or other test beds) may be linked to the main server via the subnet S3. Declared as "trusted" remote hosts, the main server and the nodes of the Test Bed can communicate between them and access the local system as local user without the supply of a password. The main server has the permission to create processes on any nodes in the Test Bed and the nodes to access the local system of the main server. In one embodiment using a Solaris operating system, a local resource is shared through NFS (Network File System) on a server with a remote host, e.g. using a remote access command as the "mount" command of Solaris. The invention is not limited to this embodiment, other embodiments using Windows NT, Linux, UNIX or other operating systems are also possible.

The main server provides a test server TS and a logging server LS. These servers may be two different servers as described hereinafter or a single server comprising the functionalities of the test and logging servers.

The test server provides a framework that allows a developer to decompose a complex test in a set of tasks to monitor, to specify which tasks to be launched and on which application of which node, to monitor and synchronize tasks from the test server. Thus, the test runs on the test server and manages the execution of the tasks on different applications of different nodes. The framework supports nodes running on different operating systems. The framework is based on a framework package installed on the test server. Other explanation will forward hereinafter.

In the following description, the term "task" designates a sequence of instructions defining for example a part of a test to be executed on a node.

A "scenario" may be a test and comprises a set of instructions comprising
  the creation (also called the initialization or the launching) of the internal components in the framework and in the different nodes.
  the creation of the task instances (also called initialization) using the synchronization of tasks i.e. the execution conditions of tasks for different applications.
  the start of tasks when a specific function is called,
  the post mortem analysis of task results and the decision concerning the scenario result,
  the end of logging and the end of the scenario.

In one embodiment, a scenario may be done as indicated in Exhibit B1. In this embodiment, this scenario comprises
  the initialization of the internal components in the framework and in the different nodes as indicated in B1-1 and B1-2. This internal components initialization will be hereinafter described in FIGS. 7A and 7B and enables respectively to manage the execution of the scenario and tasks and to log the results of the scenario and tasks;
  the initialization of the task instances A, B, C using the synchronization of tasks i.e. the execution conditions of tasks for different applications as indicated in B1-3. This task instance creation will be hereinafter described in FIG. 8;
  the start of tasks when the function defined in B1-4 is called;
  the post mortem analysis of task results and the decision concerning the scenario result as indicated in B1-5,
  the end of logging as indicated in B1-6 and the end of the scenario as indicated in B1-7.

Other embodiments may be written in different coding styles and languages.

The scenario may comprise other instructions as the cleanup of some tasks by the framework. During the scenario execution, the scenario may be called "scenario process".

The logging server provides functionalities to create log files for scenario and tasks, e.g. to retrieve traces of what instructions was done to arrive to some results, this can be useful for debugging. These log files may be created during the execution of a scenario as described hereinafter.

Figure 3:
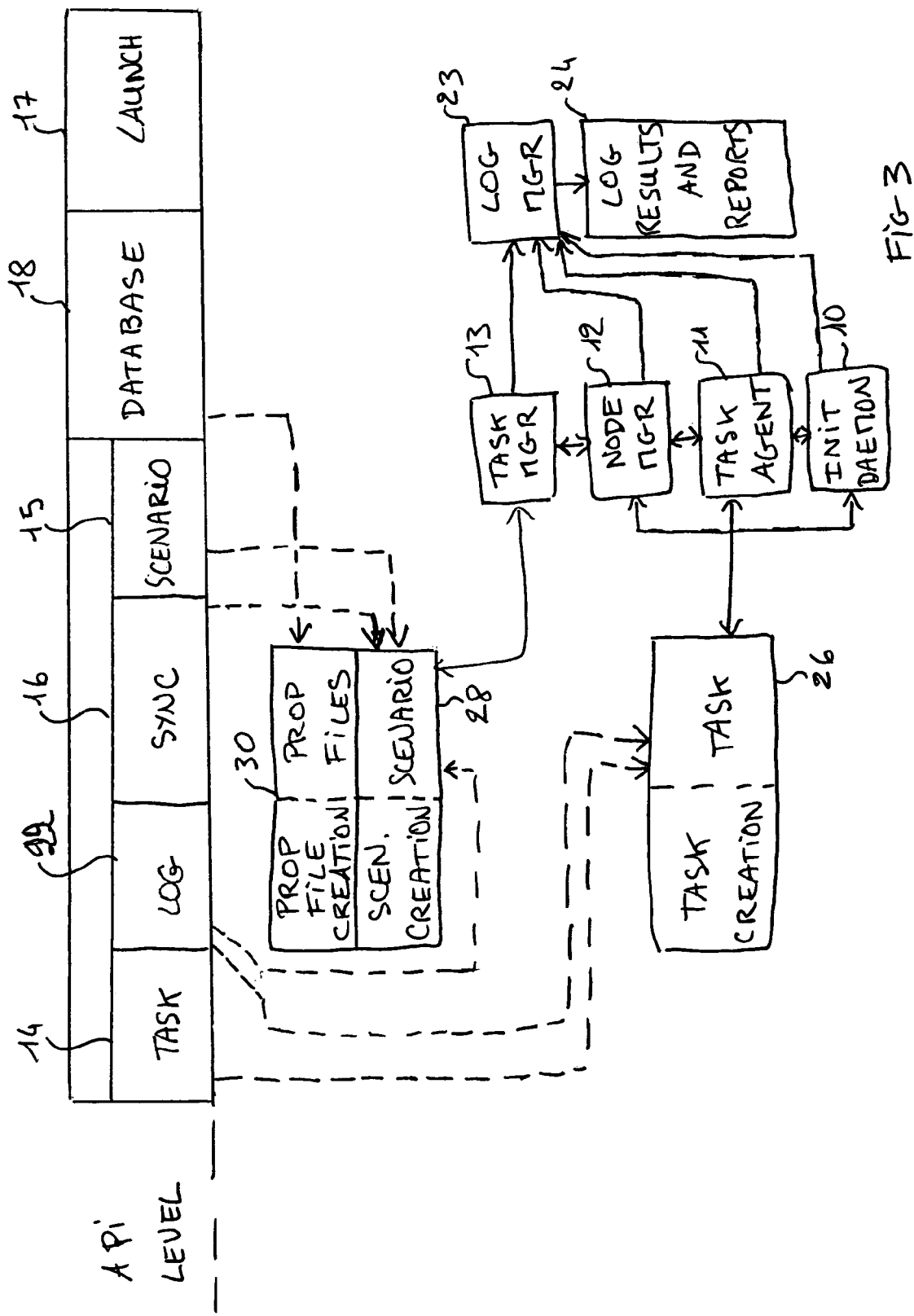
FIG. 3 shows a first embodiment of the different tools of the main server of the invention.

FIG. 3 shows two levels in the main server according to the invention, more specifically in the test server. In these two levels, the elements of the framework package of the invention, installed on the test server, are partially defined. Other elements of the framework package will be described in FIG.

4. A package is a collection of files and directories in a main architecture, e.g. a tree architecture.

The framework package installed on the test server comprises different elements such as internal components (also called framework core files), user API's, templates and development environment tools.

The API level (Application Program Interface Level) comprises libraries being a set of APIs used during the running of one or several scenario processes in the test server: the synchronization API 16, the scenario API 15, the task API 14, the Database API 18, the logging API 22 and the test launcher commands 17.

The framework package provides internal components to be executed at the execution level. Components, managing the execution of a scenario, are in a binary form or script in the framework package: Task manager binary 13, Node manager binary 12, Task agent binary 11, Log manager binary 23.

This invention may be embodied in different ways.

The entire construction of the test framework may be devoted to the test server. If so, the test server will have to use remote installation facilities existing in each node, e.g. namely "remote access daemons", which will then be sent scripts or other similar commands from the test server. Upon receipt of such a script, the node will start a local task agent, for use in this invention.

Such an embodiment of this invention is however dependant upon the existence and operation of the above discussed remote access facilities which are not or not entirely, supported by certain Operating System (OS).

Another possibility is to have "node installation" packages for installation in the nodes, to develop a resident task agent when the node is (re)booted, with the task manager then just having to call and start the task agent. This embodiment is described hereinafter in more detail. Typically, the node installation comprises:

an Init Daemon binary 10, called by the node manager and adapted to start the task agent,
an Architecture node retrieval script, (optional)
Boot time script.

Once installed on a node, the Init Daemon instance is listening on a port and waits for the node manager order to launch the task agent instance as described hereinafter.

The internal components as Task manager binary 13, Node manager binary 12, Task agent binary 11 and Log manager binary 23 are used, responsive to a scenario request launched by a test launcher as seen hereinafter, to be executed and to create Task manager process, Node manager instance for each node defined in the Test Bed configuration file, Task agent instance for each node in the Test Bed configuration file and Log manager process. For simplification, Task manager process, Node manager instance, Task agent instance and Log manager process are also respectively called Task manager, Node manager, Task agent and Log manager. In the case of a test server separated from a logging server, the logging server is linked to the test server in the same manner as a node of the Test Bed. Thus, the Log API 22 and the Log manager binary 23 can be shared on the test server side and, using the remote access, the Logging server accesses to the Log API 22 and the Log manager binary 23 so that the Log manager process runs on the Logging server.

At the execution level, a user can create files or scripts using the templates provided by the framework package. A template provides a script or file structure comprising for example the mandatory functions for the framework to work properly. These functions are also defined in the API level. In FIG. 3, the dashed arrows symbolize that a user can use the functions of the API level to adapt the created files/script, e.g. the task API can be used to create a task. Moreover, the dashed arrows symbolize that the client may call the API level when using the corresponding services, e.g. a task instance calls the log API.

The user creates tasks scripts 26 using, e.g. a task template in the framework package. A task script which is executed on a node is called a task instance. At a given instant, a task script can be executed in different task instances to test different applications on different nodes.

The user creates scenario scripts 28 using e.g. a scenario template in the framework package. The user creates the property files 30 using e.g. a configuration file template in the framework package. These property files may comprise configuration files, e.g. configuration files comprising the framework configuration data, node configuration data (called Test Bed configuration files) or configuration files comprising information used in one or several determined scenarios (called Scenario configuration files). The test bed configuration files also comprise the environment information concerning the log base directory where log files will be stored (directory which may be retrieved by for the logging server using the remote access), the addresses of the test server, the address of the logging server, the port number of the test server for internal communication, the port number for the framework to communicate with the logging server. Environment information may comprise additional information. These property files may be object oriented files. The framework define class files comprising classes with attributes like java classes. These property files comprise class instances which assign to the attributes of the class their current value. A checker of the framework checks the syntinx/semantic errors in the property files. These property files support user defined classes.

In the following description, the test related data comprise task information such as execution condition, node information or any other information or data related to the task synchronization in the test.

As described hereinafter in FIG. 8, task information are sent from the scenario to the task manager process, the node manager instance and the task agent instance. The task manager process communicates with the node manager instances, each node manager instance communicating with a task agent instance on its node, each task agent instance communicating with a task instance.

A task script 26 may be defined by a user using task APIs and task template. Exhibit B2 illustrates an example of a task structure according to the invention and comprising the different parts in a non exhaustive way:

the task specific procedures comprise functions defined by the user and which may use the task API 14; in the example B2-1, the function sends two notifications "STARTED" and "FINISHED" using the task API. Other APIS provided by the framework may also be used, except the scenario API.

the task initializes itself to the Task Agent instance or cleans up and exit if there is a problem (B2-2), the task blocks and waits for the Task Manager process (via the node manager instance and the task agent instance) to send a notification to start (B2-3), the task name is user defined and the user calls the HM-StartLogging function of the Logging API to create a task log file (B2-4), the task specific procedure is called and its result is analysed to determined whether the task is successful or not. The task result is sent to the Task Manager process (via the node manager instance and the task agent instance) (B2-5) and stored in the task log file and in memory, the task is blocked, waiting for the the Task Manager process (via the node manager instance and the task agent instance) to send a message to finish (B2-6)

the logging services are then closed and the task stops (B2-7).

The task described hereinabove is only an example of task structure. Other functions or parameters may be used, such as the type of task which may be of finite execution or of infinite execution. The task script 26 may be seen as a software code defining task and more specifically test task. Task APIs and task template may be seen as software code for a user to define task and more specifically test task.

The different APIs are now described.

Figure 7A:
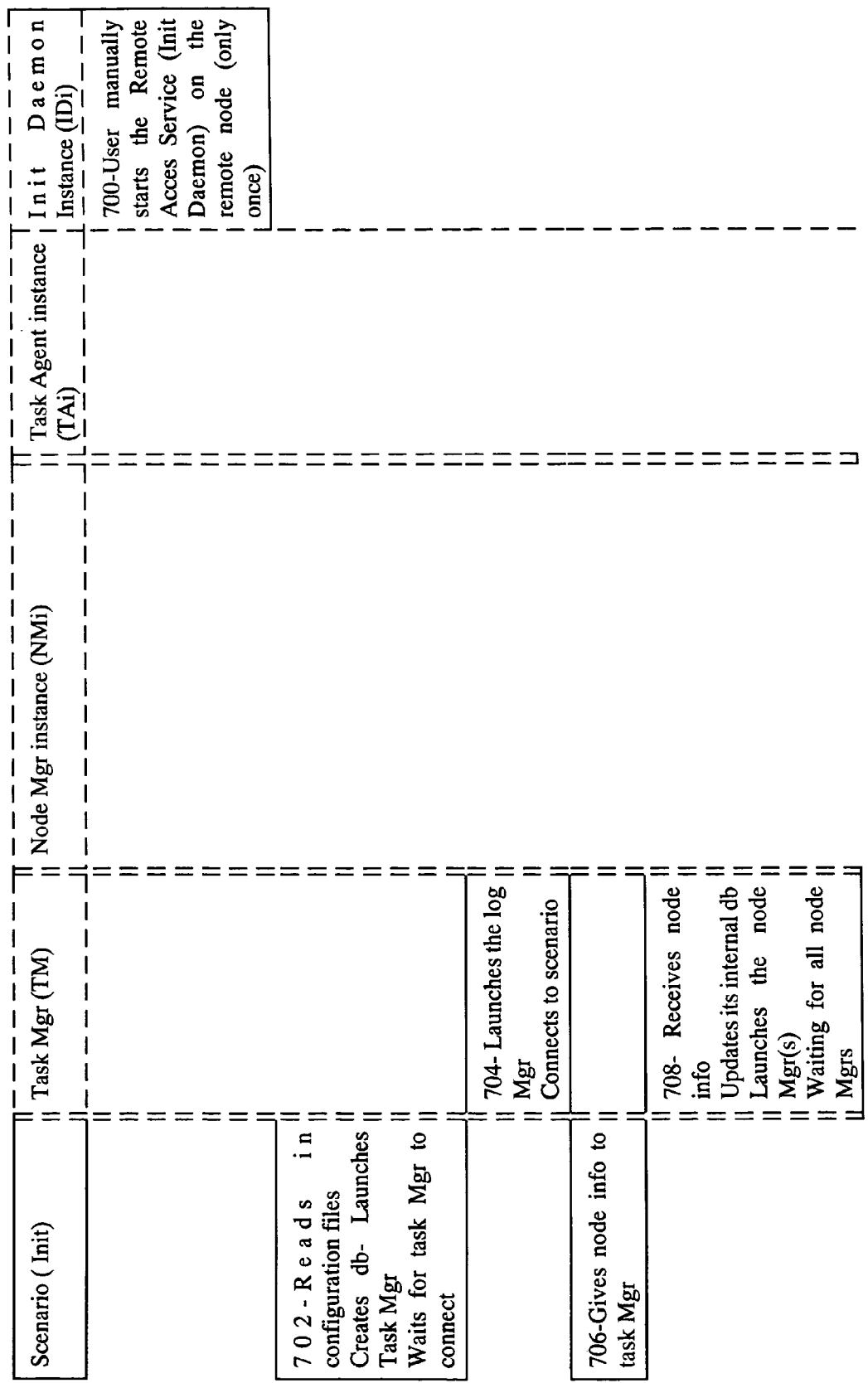
FIG. 7A is the beginning of a flow chart of the processes initialization managed by the main server according to the invention.
Figure 7B:
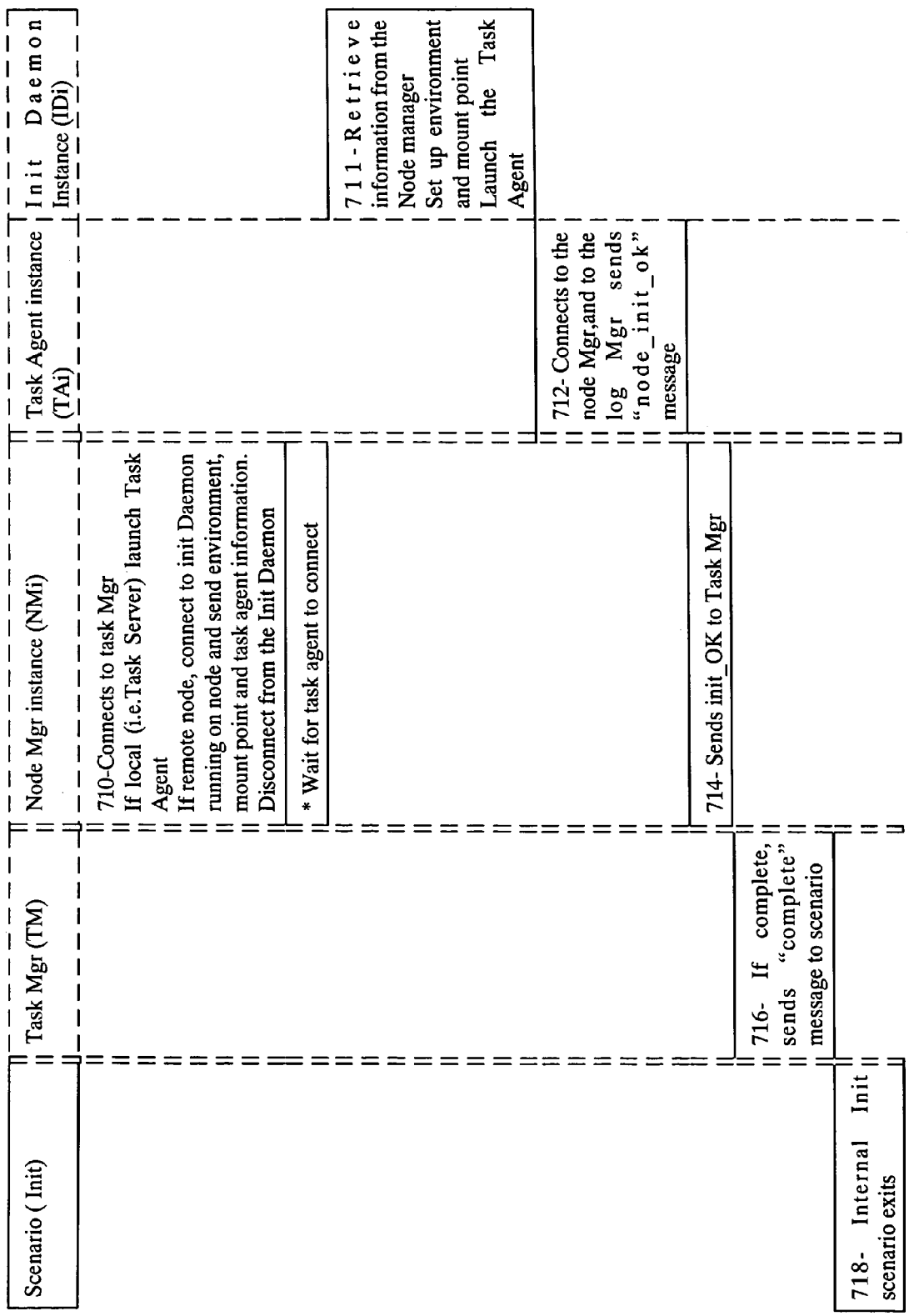
FIG. 7B is the continuation of the flow chart of FIG. 7A.

The scenario API 15 comprises command functions to be called in the scenario to interact with the internal framework of the test server:

a command function (HM-InitScenario( )) that initialises the internal components of the framework as described in the process initialization of FIGS. 7A and 7B, a command function (HM-EndScenario( )) that cleans up and close the internal components initialized with HM-InitScenario( ), a command function (HM-NotifyScenarioResult( )) that stores the result of a scenario in a log file of the logging server, a command function (HM-CheckResult( )) that returns the result of the task instance in the scenario after its execution, a command function (HM-GetResults ( )) that returns the list of the results of the task instances in the scenario after its execution, a command function (HM-CheckResults ( )) that gets the list of the results of the task instances in the scenario after its execution and checks if the list of results match a list of expected values, a command function (HM-MonitorTasks ( )) that signals to the Task Manager process that no other task information is to be registered in other synchronization command as described hereinafter and that sends a start message to the Task Manager process to begin the monitoring and the execution of the various task instances. A monitoring time-out is sent to the Task Manager process which is responsible to start and stop the task instances according to execution conditions defined hereinafter. This command function is responsible to block until a message is sent by the Task Manager process to the scenario, e.g. a message signaling all the registered results of the task instances or a monitoring time-out error if results miss. Afterwords, new task instances may be registered and monitored if the user wishes. Other monitoring functions may be assigned to this command function according to the invention.

The task API 14 comprises command functions to be in the task script and to be called in the task instance to interact with the task agent instance:

a command function (HM-InitTask( )) that initializes the task instance, connects and registers the task instance to the corresponding Task agent instance, a command function (HM-EndTask( )) that closes all communication between the task instance and the corresponding Task Agent instance, a command function (HM-WaitForSignal( )) that blocks the task instance in its current state until the Task Manager process sends a message to unblock.

a command function (HM-NotifyCondition(condition-tag)) that notifies a condition notification. A condition notification comprises the current execution state of the task instance, e.g two execution states may be "Started" when the task instance has started and "Finished" when the task instance has finished. Other execution states of the task instance may be defined by the user as user defined strings, also called user defined messages. This may be an "amount of bytes transferred" when the amount of bytes transferred from a file to another has been executed by a task instance. These are called user defined condition notifications. These notifications are sent by the task instance and are received by the task manager process via the task agent instance and the node manager instance. These notifications enables some of the managers to update their database and the task manager process to decide to start or stop other task instances.

a command function (HM-NotifyTaskResult(result-value)) that writes the result of a task instance in an appropriated log file and sends the result to the framework.

The Synchronization API 16 comprises synchronization commands, called execution conditions, which describe the execution relationships between one task instance and a set of other task instances. These synchronization commands have, as input parameters, the task and the node on which a task instance is initialized and may define an execution condition (e.g. start/stop condition) of the task relative to the execution state of another indicated task (e.g. started/finished state). When the MonitorTask( ) function is called in the scenario, a start indication (e.g. a message) is sent to the Task Manager which checks the execution conditions (synchronization commands) in its database to begin the monitoring and the execution of some task instances on nodes. Thus, these execution conditions enable the Task Manager to synchronize the execution (e.g. the start and/or the stop of the task execution) of tasks instances on different nodes of a group of nodes, e.g. according to conditions reached by other tasks, also called execution states of tasks:

the synchronization command A1-1 that runs a determined task (task) on a specified node (node) with a set of parameters. This synchronization command A1-1 does not specify any relationship with other tasks. The set of parameters may comprise task parameters and context parameters, e.g. a flag defining if a task instance is created in a synchronous or asynchronous mode with a specified timeout value (sync-flag), a flag defining if the task instance currently running on a node is re-created as soon as the node is available after a scheduled node reboot (ha-flag);

the synchronization command A1-2 that runs a task instance when a user wishes to schedule the start of a task (task) on a node (node) when some other tasks instances, which may be a list of tasks (taskIDList), reach some conditions, which may be a list of conditions (ConditionList), e.g. execution states of task instances. A set of parameters is also defined;

the synchronization command A1-3 that runs a task instance when a user wishes a task instance (task) to start on a node (node) at the begining of a scenario and to schedule the stop of the task instance when other specified task instances (taskIDList) reach some conditions (ConditionList). A set of parameters is defined;

the synchronization command A1-4 is a combination of A1-2 and A1-3. A1-4 runs a task instance when a user wishes to schedule the start of a task instance (task) on a node (node) when some other tasks instances (taskIDListStart) reach some conditions (ConditionList-Start), e.g.execution state of task instances. The task instance is running until other specified task instances (taskIDListFinish) reach some conditions (ConditionListFinish). The created task instance A1-4 performs a set of operations in an infinite loop. A set of parameters is defined;

the synchronization command A1-5 that runs a task when a user wishes a task instance (task) to start on a node (node) at the beginning of a scenario and to schedule the stop of the task instance when all other task instances have finished running and declared it. A set of parameters is defined;

the synchronization command A1-6 is similar to A1-2 but differs from it in the fact that the task instance, once finished, is re-initialised whenever similar conditions to start re-appears.

the synchronization commands A1-7, A1-8, A1-9, A1-10 are respectively similar to A1-2, A1-3, A1-4, A1-5, A1-6 but differs from them in the fact that the start conditions, respectively end conditions (e.g. the list of conditions) that the task instances have to reach in order for a task instance to be created, respectively stopped on a node, are linked with operands such as AND, OR, NOT operands. In the command functions A1-7, A1-8, A1-9, A1-10, if there are several conditions that the task instances have to reach, these conditions are implicitly linked with an AND operand. A start complex boolean expression, respectively an end complex boolean expression (CondExpr for A1-7, A1-8, A1-9, CondExprStart and CondExprFinish for A1-10) is thus created in the command functions A1-7, A1-8, A1-9, A1-10; complex task scenario process is thus advantageously supported by the invention.

The synchronization functions enables a user to define an execution condition for a task instance on a node. This execution condition is in relation with the execution state of another task instance or other task instances running on different nodes of the group.

The Database API 18 comprises command functions to create and access a database. These command functions may be used by the scenario process when reading the property files. Thus, the scenario process creates a database comprising property files to be passed to the framework and the task scenario processes. As seen, these property files may be user defined and provided in the form of files, e.g. text files. They comprise node configuration files, on which task instances will be applied, and defining the task scenario configuration files. In an example of the invention, the property files are organized in an object oriented structure. Thus, the command functions may also provide known oriented object functions to read and/or write in the property files of the created database to update such a database.

The Logging API 22 comprises command functions
to create a log file (HM-StartLogging( )) for a scenario process, a task instance or any components of the main server,
to close the created log file (HM-FinishLogging( )),
to write information in the created log file (HM-Log( ))
to retrieve the location of the created log file in a log directory structure.

The logging server is adapted to use these functions in order to registered the created log files in the log directory structure 24.

Figure 4:
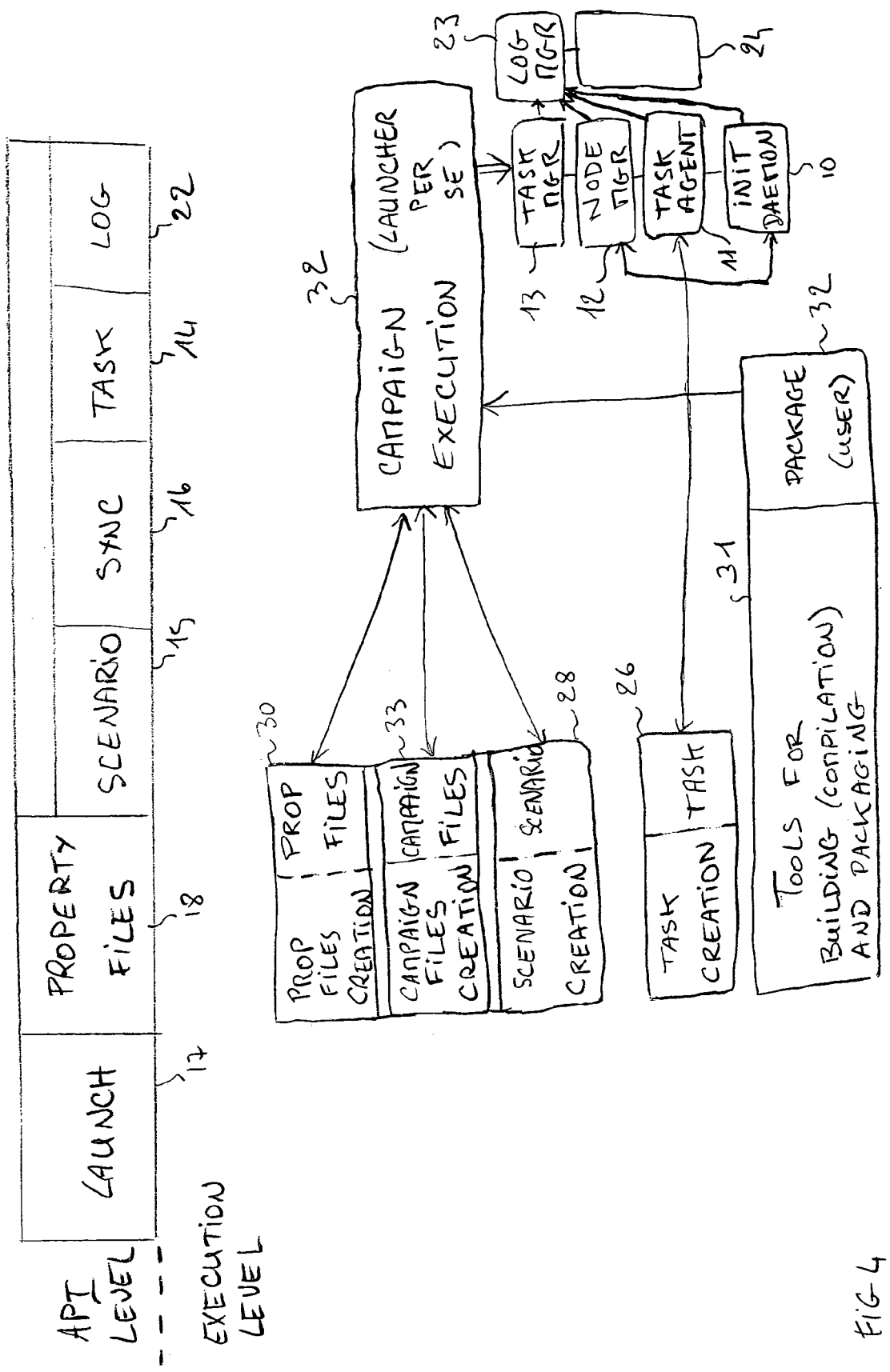
FIG. 4 shows a second embodiment of the different tools of the main server of the invention.

FIG. 4 shows the same elements as in FIG. 3 and other elements of the framework package. These elements are now described in reference with FIG. 4.

The launcher 32 (or test launcher) enables a user to launch a scenario or a series of multiple scenarios in sequence, also called a scenario sequence or test campaign. This launcher is adapted to interact with the software code defined to execute functions in the scenario to start the task manager, the node managers, the task agents and to deliver test related data to the task manager.

The framework package provides a template to create a campaign file 33 defining the sequence of the several scenarios to execute for example in a given order. The property files 30 define the group of nodes for the scenario sequence. The log manager may create log files, and, from them, create a summary report that can be used from a web browser. A front-end graphical unit interface (GUI) may be used to enable a user to build a scenario sequence from existing scenario elements, associated to tasks.

The framework package also comprises tools for the user to compile the workspace and to create a set of test packages on the server, a package being a collection of files and directories as seen. A test package may contain elements of the framework package as the framework core files, templates, user API's, launcher command and elements built by the user as the campaign files, the scenarios and the tasks, the configuration files. The test package is preferably installed on the main server using e.g. a standard Solaris package command functions, and is reachable by nodes (e.g. with NFS, Network File System) on which task instances are to be created. In this case, the test package directory is shared by the main server and nodes. In another embodiment, the test package may be installed on each of these nodes. By building such package(s), the software product can be easily installed or transferred in another distributed environment. In other words, the framework provides tools for building (compiling) and create an architecture (directory) containing all the scenarios and related files to provide the tests as a product. Using the elements of a test package, any user defined scripts or files in the test packages may be user modified and other scripts may be created by the user. A test package may be thus framework package independant.

At a given instant, several scenario processes can execute different task instances to test different applications.

Figure 5:
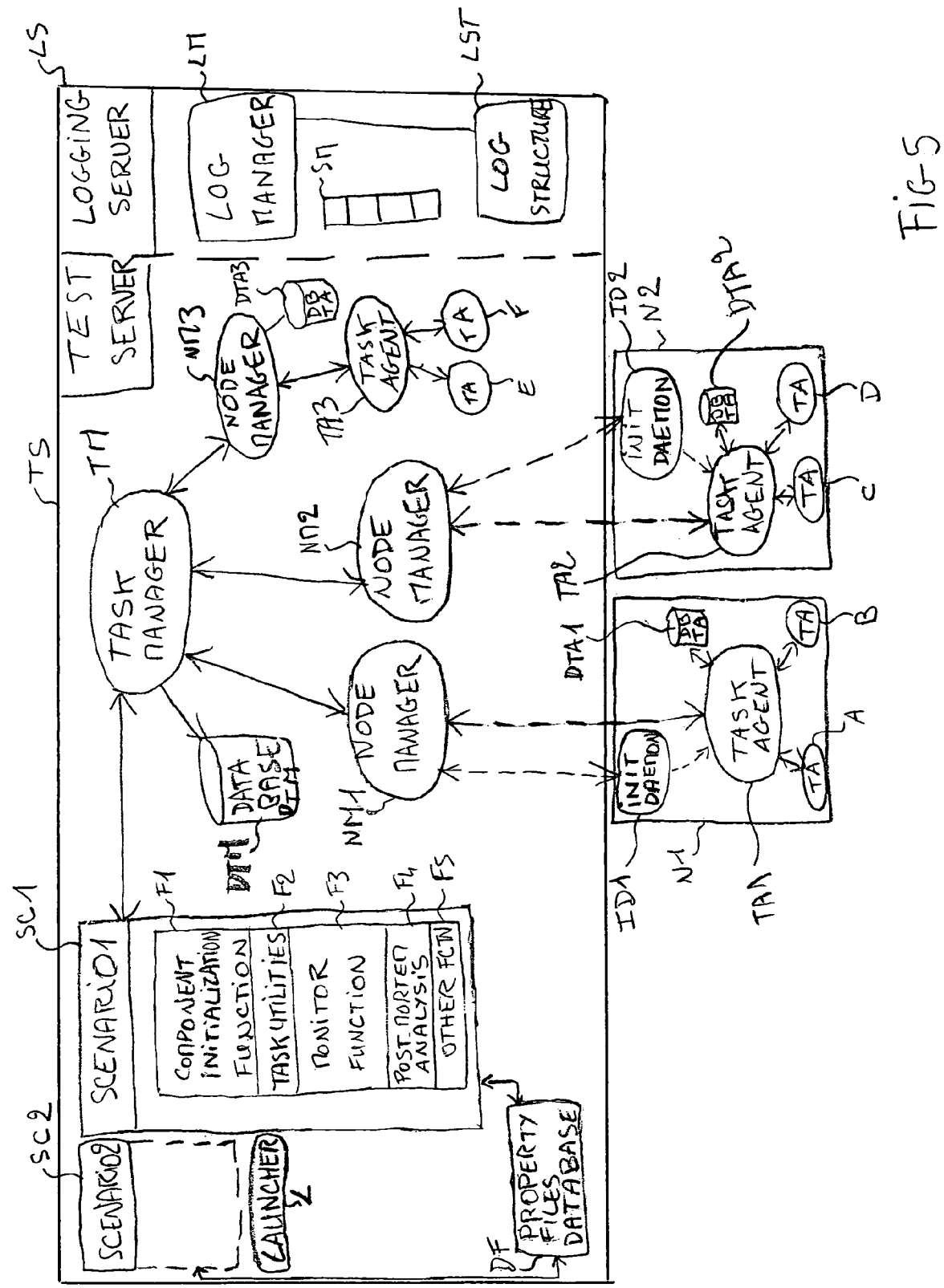
FIG. 5 shows an exemplary diagram of the execution of task scenario process managed by the main server of FIG. 3 in nodes of the distributed environment of FIG. 2.

FIG. 5 is a logical view of the main server and its interactions with nodes of a test bed. This FIG. 5 will be described in relation with the flow-charts of FIGS. 6 to 9.

Flow chart 7A, 7B, 8, 9A, 9B, 10A, 10B are build in order to facilitate the reading of such flow-chart. Using different columns, the flow-charts illustrate in which internal component the different operations are executed.

In the different flow-charts, forwarding a received message may be also implemented as a transmission of a message which may comprise partially the information or data of the received message.

Figure 6:
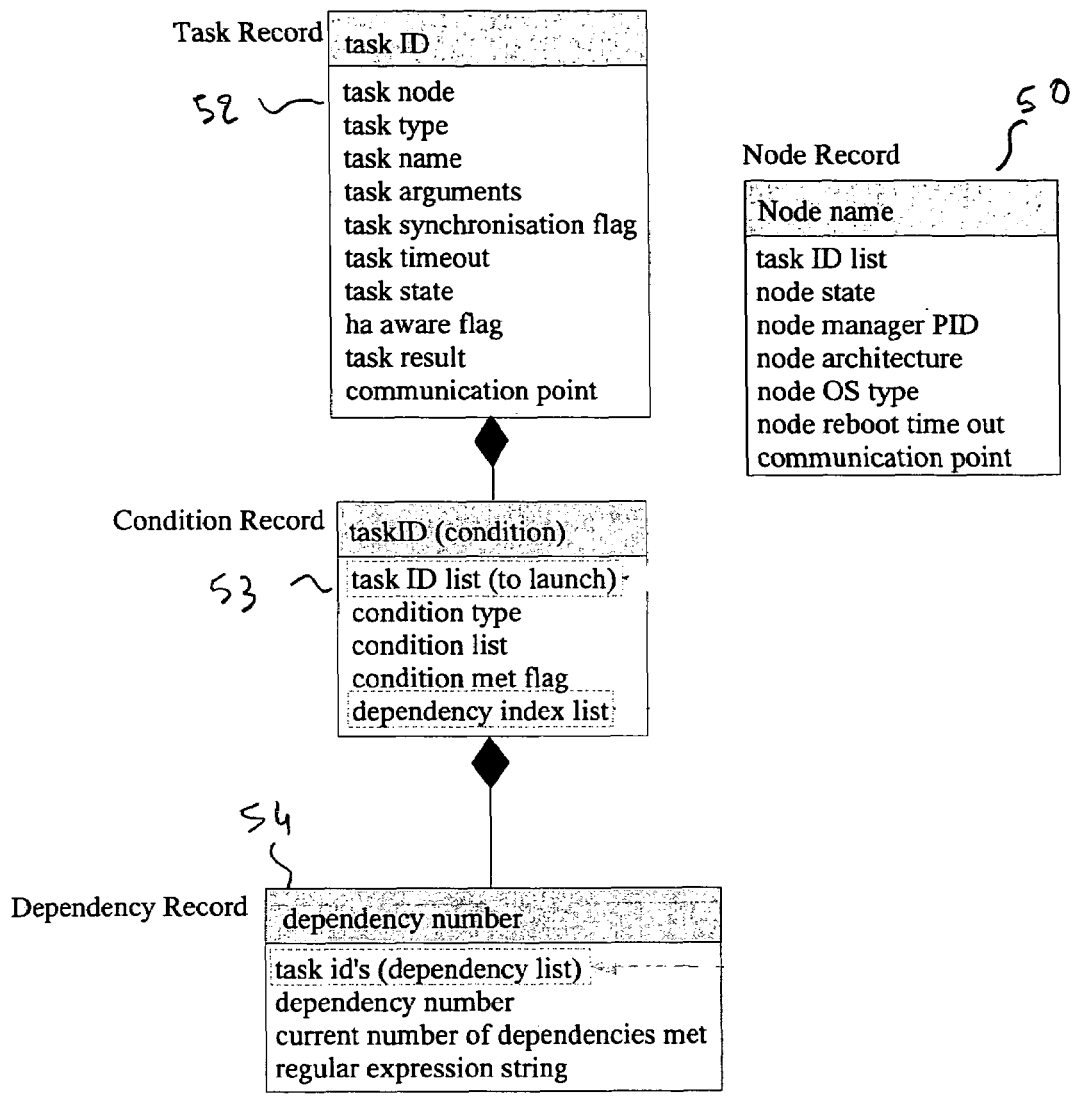
FIG. 6 is an exemplary diagram of the data organization in a database of the main server.

In the flow-chart of FIG. 6, the internal components of the framework are initialized through the HM-InitScenario( ) function F1 of a launched scenario SC1 of FIG. 5.

Nodes on which task instances may be created are defined in test bed configuration files, i.e. in the property files database DF of FIG. 5. At operation 700, a user starts manually the Remote Access Service (Init Daemon instance ID1 in node N1 and ID2 in node N2) on the remote nodes. At operation 702, the scenario SC1 creates a database DF in the first memory using the Database API 18 of FIG. 3 to read the test bed configuration files. The scenario process creates the Task manager process TM on the test server. It may also use a property database DF for storing environment information, like log server name, node daemon port number, nodes to be used in the test. The scenario process waits for the Task Manager to connect. At operation 704, the task manager process creates the log manager process LM on the logging server LS and gives the required information as environment information to enable the Logging server to create a log structure LST in a memory. This log structure is adapted to store log files in different directories for scenario log files, task log files or other.

At operation 704, the Task Manager process TM registers itself with the log manager LM to create a Task manager log file in the log structure LST. The Task Manager connects itself with the scenario process. At operation 706, the scenario process gives node information to the Task Manager. This node information comprises node name, node architecture, node OS type, node reboot time-out using the Property database DF, task manager port number. At operation 708, the node information are received by the Task Manager process which updates its internal database DTM in creating a node record as hereinafter described in reference with FIG. 6. The Task Manager process TM creates Node Manager instances NM1, NM2 for each node N1, N2 which are in the Test Bed Configuration file and for which node information have been received. The Task Manager process also sends node information such as architecture and node reboot timeout to each Node Manager instance. The Task Manager process TM waits for all Node Manager instances NM1, NM2 to establish a connection.

At operation 710, each Node Manager instance establishes a connection with the Task Manager process TM. The node manager instance NM registers itself with the log manager process LM to create a node manager log file in the log structure LST. If the creation of the task agent is a local creation, i.e. in the test server, the node manager instance (NM3) launches a local Task agent instance (TA3). If the creation of the task agent is a remote creation, i.e. in a remote node, a node manager instance (NM1, NM2) establishes a connexion with the Init Daemon instance (ID1, ID2) and sends to the Init Daemon instance environment, mount point (or communication point) and task agent information, which may be code capable of creating a task agent . Each Node Manager Instance waits for the Task agent instance to connect once done the complete initialization of the Task agent instance (TA1 in node N1; TA2 in node N2). At operation 711, the Init Daemon instance retrieves information from the node manager, sets up the environment, creates the mount point or communication point and launches the Task agent instance on the node (TA1 in node N1; TA2 in node N2). At operation 712, the task agent instance establishes a connection with the log manager process to create a task agent log file in the log structure LST. The task agent instance also establishes a connection with Node Manager instance and sends a "node-init-ok" message. At operation 714, the Node Manager instance establishes a connection with and sends an "init-OK" message to the Task Manager process. At operation 716, if all Node Manager instances have sent an "init-OK" message, the Task manager process informs the scenario process that the initialization of all internal components is done. The task Manager process sends a "complete" message to the scenario.

At operation 718, the internal initialization is finished, the HM-InitScenario( ) function ends.

Figure 8:
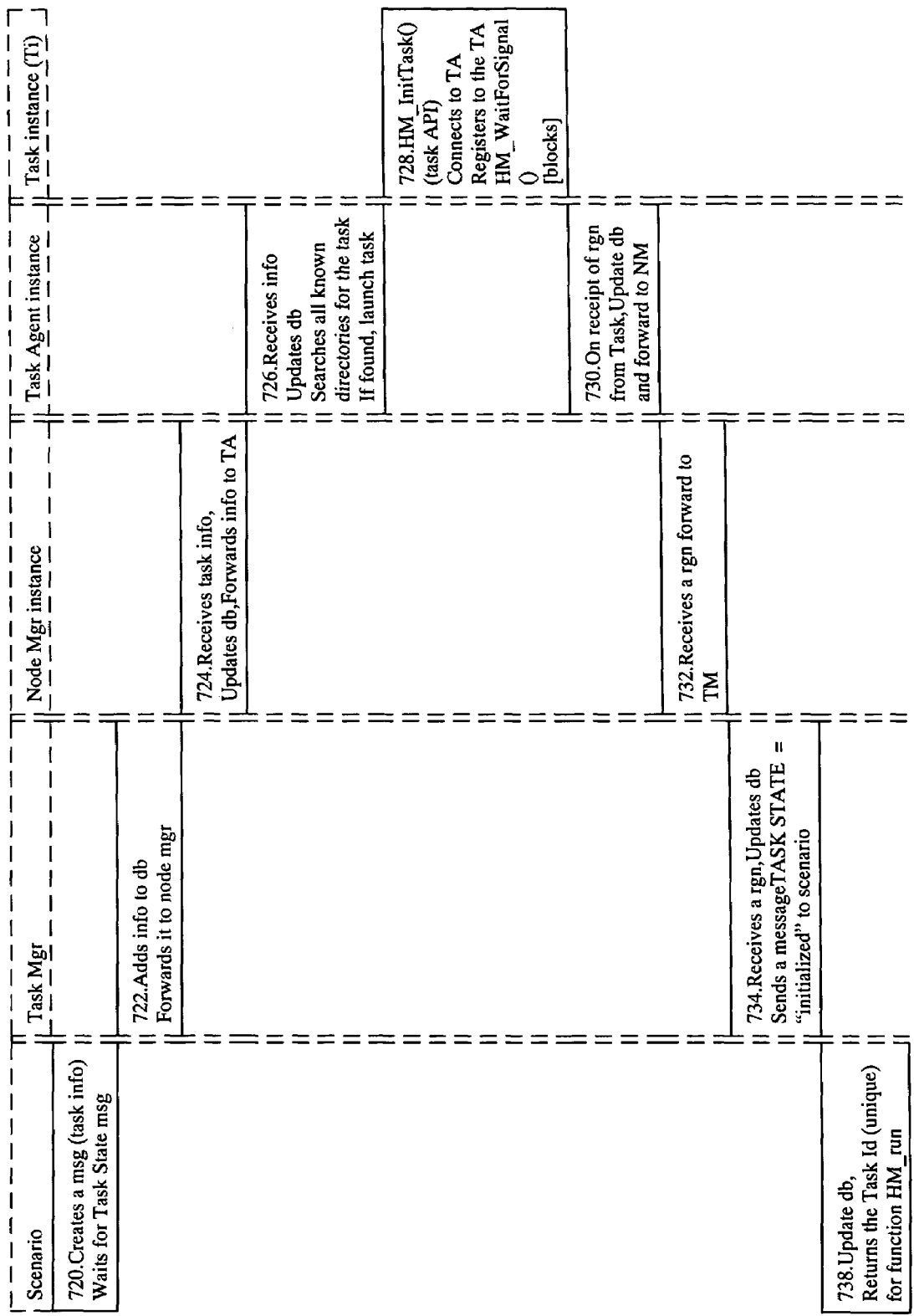
FIG. 8 is a flow chart of the task initialization managed by the main server according to the invention.

An initialization software code is provided to execute the operation of the flow chart of FIGS. 7A, 7B and 8 upon interaction of the test launcher.

FIG. 8 illustrates the task initialization according to the invention.

At operation 720, the scenario process creates a message comprising task information such as the task utilities F2 of FIG. 5, this message being sends to the Task Manager process. At operation 722, responsive to reception of the task information, the Task Manager process stores the task information in its database DTM in a second memory. In the example of FIG. 6, three records are added to the node record: the task record 52, the condition record 53 and the dependency record 54.

The task manager process TM sends the task information to each node manager instance which stores the task identification locally in its database and sends partially this task information to the task agent instance at operation 724. The task agent instance stores some task information locally in a task agent database DAT. It then searches all known directories in the test server to retrieve the task script to create the task instance on the node. The task agent instance uses the mounting point. The task agent is thus adapted to retrieve tasks available in the software code (e.g. task scripts) defining the tasks. If found, the task instance is creates on the node and the task agent instance waits for the task to register itself. At operation 728, the HM-InitTask ( ) function of the task API is launched on the node. The task instance is created and establishes a connection with the task agent instance on the test server using the remote access point. The task instance registers to the task agent instance signifying that the task instance waits for a "start" message, in order to start the task instance execution.

At operation 730, the Task Agent instance receives the registration (rgn) message from the task instance, updates its database and sends a registration message of the task instance, e.g. forwards the registration message received from the task instance, to the node manager instance. At operation 732, the node manager instance receives the registration message and sends a registration message of the task instance to the Task Manager process, e.g. forwards the registration message received from the task agent. At operation 734, the Task Manager process receives the registration messages from node manager instances, updates its database DTM and sends a message to the scenario comprising the state of the task instances as "initialized". At operation 738, the scenario process updates its database and returns the Task identifier (task ID) unique for a task instance and ends the task initialization.

To communicate between the logging server and the task manager process, the node manager instance, the task agent instance, the scenario process and the task instances, socket-based messaging API is used.

The framework of FIG. 5 comprises launcher L adapted to start and to manage a test campaign defined by several scenario processes started on the test server. The test launcher may enable a user to define the scenario processes to be launched in a test campaign and to define the test bed configuration to be used for the execution of the test campaign. The test launcher is also used to start a test and thus interacting with the initialization code for the creation of the management components and for the sending of test related data to the task manager process.

The log manager LM is adapted to create log files for task results in a directory structure LST defining the test campaign comprising the scenario process results, itself comprising the task instance results.

The task manager process, the node manager instance, the task agent instance, the launcher, log manager are processes managing the execution of task instances on nodes and may be seen as task management processes.

First, second and third memories may be distinct memories or portions of a memory.

FIG. 6 is hereinabove described in detail. Records comprise task information such as task parameters and execution condition.

The task record 52 comprises
the "task identifier (task ID)", this field is the key of the record,
the "task node" being the node that the task will be launched on,
the "task type",
the "task name",
the "task arguments",
the "task synchronization flag" being asynchronous or synchronous,
the "task time-out"
the "task state" being the current state of the task (not-registered, initialised, running, rebooting, killed, exit-abnormal, timed-out, finished, not-run)
the "ha aware flag" defining if the task instance is recreated if the node reboots,
the "task result" being the result of the task as a list of return codes,
"communication point" being the path to communicate between the task instance on the node and the logging server.

The condition record 53 comprises the following records:
the "task ID (condition)" defines the identification of the task that will send the condition notification message (or task state message) that the scenario is interested in, this is the key of the record,
the "task ID list" defines the list of the tasks that depend upon the condition of the preceding "task ID (condition)". The task instance will be created or stopped once the condition stored in the "condition list" below is reached. This list of task ID corresponds to the indexes to the task record 52.
the "condition type" corresponds to the action to be carried out on the task when the condition(s) have been reached, e.g. to start or to stop the task,
the "condition list" corresponds to the list of conditions that each task in the "Task ID list" attribute is waiting for,
the "condition met flag" corresponds to a flag adapted to determine whether or not all conditions have been met for a certain task to start or to stop,
the "dependency index list" corresponds to the list of indexes to the various dependency records of record 54.

The dependency record 54 comprises the following records:
the "dependency index" corresponds to the index number of the dependency record, i.e. the key to the record,
the "task ID list (condition)" corresponds to the list of conditions that are dependent upon each other,
the "dependency number" corresponds to the number of conditions that have to be met,
the "current number of dependencies met" corresponds to the number of conditions already met,
the "regular expression string" corresponds to the string holding the regular expression describing the relationship between all the condition records, e.g. boolean expression as seen.

The node record 50 comprises the following records:
the "node name" corresponds to the key of the node record; there is one node record for every node used by the scenario,
the "task ID list" corresponds to the task IDs that are to be run on the node during the scenario,
the "node state" corresponds to the current node state and may have the different values, e.g. node-stopped, node-rebooting, node-running, node-scheduled-to-reboot,
the "node architecture" corresponds to a string that define the hardware type, sender type, Operating system type, e.g. sparc-sun-solaris
the node "OS type"
the "node reboot time-out" corresponds to the time-out value associated to the maximum time allowed for the node to reboot,
the "communication point" corresponds to the path to communicate between the node and the test server.

Figure 9A:
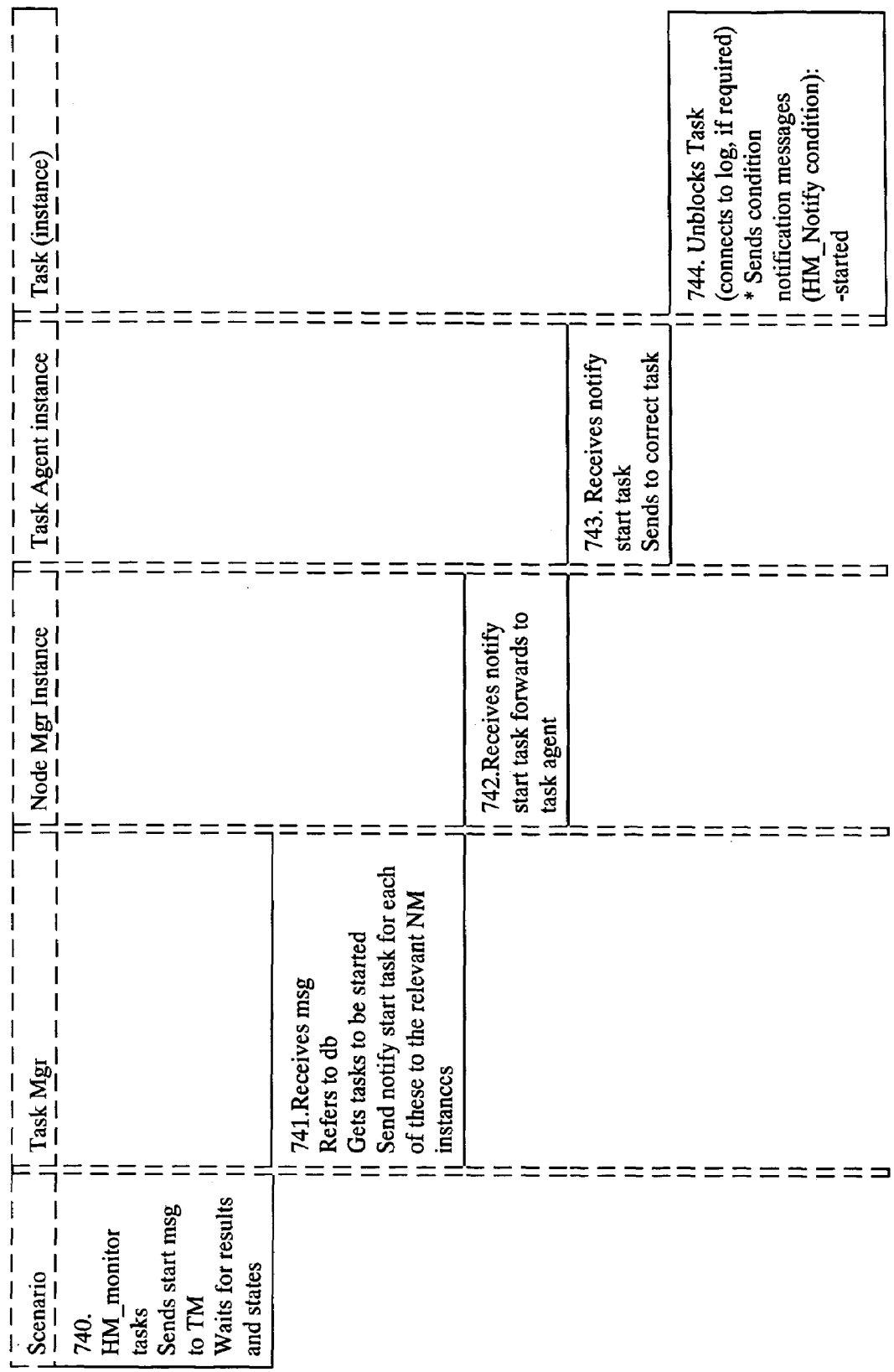
FIG. 9A is the begining of a flow chart describing the task scenario process execution according to the invention.

FIG. 9A and 9B illustrates the scenario process execution following the internal components and task initialization of FIGS. 7A, 7B and 8. At operation 740, the HM-Monitor-Tasks( ) function F3 of FIG. 5 in the scenario process is called. The scenario process sends to the task manager process a "start" message (e.g. a "notify start task" indication) and a monitoring time-out to start along with the scenario process to be executed. The scenario process waits for results and state messages from the task manager process. At operation 741, the task manager process receives the "start" message from the scenario process. It refers to its database DTM and gets the task to be started according to the executions conditions stored in the condition record. The task manager process sends a message indicating to start, e.g. forwards the "start" message, or a user defined string, to the appropriated node manager instance(s) and begins a timer to monitor the monitoring time-out. At operation 742, the node manager instance receives the message indicating to start and sends another message indicating to start, e.g. forwards the message received from the task manager process, to the corresponding Task agent instance. At operation 743, the task agent instance receives the message and sends a message indicating to start to the correct task instance in the node, e.g. forwards the message received from the node manager instance. At operation 744, the task instances unblocks and connects to the logging server if required. Using the HM-Notify-condition( ) function of the task API, it sends a condition notification message (e.g. a state message) comprising the execution state "started" of the task instance to the task agent.

At operation 745, the task instance executes user defined task code. At operation 746, the task agent instance receives the "started" state message and registered it with the task time-out. The "started" state message is sent to the node manager instance. At operation 747, the node manager instance updates its database and sends the "started" state message to the task manager process. At operation 748, the task manager process updates its database and sends a "started" state message to the scenario process. Then, it searches in its database if execution conditions of some tasks are fullfilled with the execution state "started" of the task instance. In this case, the task instance(s), for which the execution condition(s) is (are) fullfilled, is (are) started/stopped. As seen, the execution condition comprises stop execution condition and start execution condition. These execution conditions are defined in the HM-run( ) function for the task. For each task instance to be started, the flow-chart continues at operation 741, for each task instance to be stopped, the flow-chart continues at operation 751. For the task to be stopped, these are the tasks executed in an infinite loop and waiting for a task stop to stop their execution. The other task executed in a finite loop stops at the end of their execution. For these tasks, flow-chart continues at operation 755.

At operation 751, the task manager process sends a "stop" message (e.g. a "notify stop task" message) for each task to be stopped to the relevant Node manager instances. At operation 752, the node manager instances receive the "stop" message and forwards it to the task agent instance on the corresponding node using the remote access. At operation 753, each task agent instance receive the "stop" message and sends it to the correct task instance. At operation 754, the task instance receives the message and continues at operation 755.

At operation 755, the task ends and sends a task state notification message "finished" and a result message to the task agent instance. The task instance is also blocked in a waiting state to be executed again or to definitely finish. At operation 756, the task agent instance receives the "finished" state message and the result message and forwards the messages to the node manager instance. The task agent instance cancels the task time-out. At operation 757, the node manager instance receives the "finished" state message and the result message and forwards the messages to the task manager process. The node manager instance deletes the task information from the database. At operation 758, the task manager process receives the "finished" state message and the result message and forwards the messages to the scenario process. The task manager process updates its database. Then, it searches in its database if execution conditions of some tasks are fullfilled with the execution state "finished" of the task instance. As in operation 748, for each task instance to be started, the flow-chart continues at operation 741, for each task instance to be stopped, the flow-chart continues at operation 751.

Operation 741 to 748 and operation 751 to 758 can be executed in parallel for different task instances and if execution conditions of task are fullfilled according to other task execution state(s). To monitor the execution conditions, the condition record and the dependency record of FIG. 6 are used and updated by the task manager process. At operation 760, the task manager process has received all results from all tasks. In this case, it sends a "monitor stop" to the scenario to stop the monitor function. The monitoring time-out is canceled. At operation 761, the scenario process receives the "monitor stop" message and the call of the HM-monitor-Tasks( ) function is over.

The scenario process analyses the task results sent by the task manager process. Thus, the scenario process comprises a function to receive and analyze the task results in order to provide the test result. Obtained results are compared to expected results after operation 758. In case of a monitoring time-out, if the monitoring time-out is reached before all task results were received by the task manager process, a time-out error message is sent to the scenario process.

The role of the task agent during the task execution of FIGS. 9A and 9B i.e. once the task has started on the node.

At operation 746, the task agent receives a "started" condition (i.e. a task state message) from the task, the task state message "started" specifying in this case that the execution of the task has just started on the node. The task agent registers the task time-out for the task. If the task time-out is reached before the task state message specifying "finished" is received by the task agent from the task, then the task agent sends an error message to the node manager instance (not shown in FIG. 9B). Else, responsive to the "finished" task state message, the task agent deletes the task time-out and closes communication between the task agent and the task at operation 756. The node manager process sends an error message to the task manager process which updates its internal database for this task instance with this error message for example.

Moreover, the node manager instance monitors the node state changes, e.g. the reboot of the node. If a node reboots, the node manager instance detects this node state change and sends a node state change message to the task manager process which updates its internal database. According to the task information of its internal database, and particularly according to the ha aware flag parameter in the execution condition, the node manager instance recreates a task agent on the rebooted node. The task agent also recreates the task instance.

In the hereinabove description, other task state messages may be used according to the invention, such as user defined messages.

Concerning the log manager process once initialized, the task manager process, the node manager process, the task agent process register with the log manager process. The scenario, the tasks register wtih the log manager process using the logging API as seen. The internal communication with the log manager process may use socket-base messaging. Once registered, the task manager process, the node manager process, the task agent process send logging message to the log manager.

The Logging server is a mean to retrieve and to store scenario and task results and component information of the test server. Other means retrieving results may also be used according to the invention. Moreover, operations in the flow chart concerning the logging server and its use may be optional.

Figure 10A:
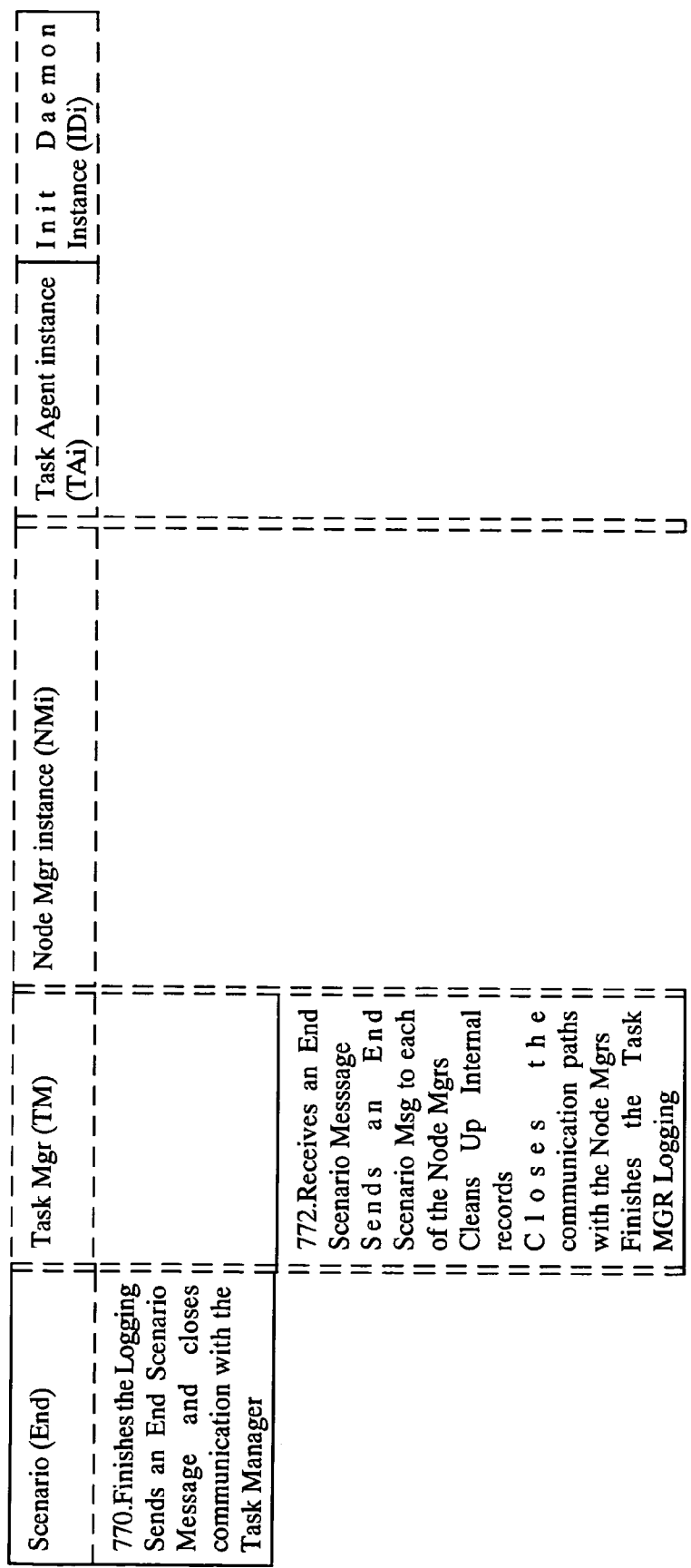
FIG. 10A is the begining of a flow chart describing the processes ending managed by the main server according to the invention.
Figure 10B:
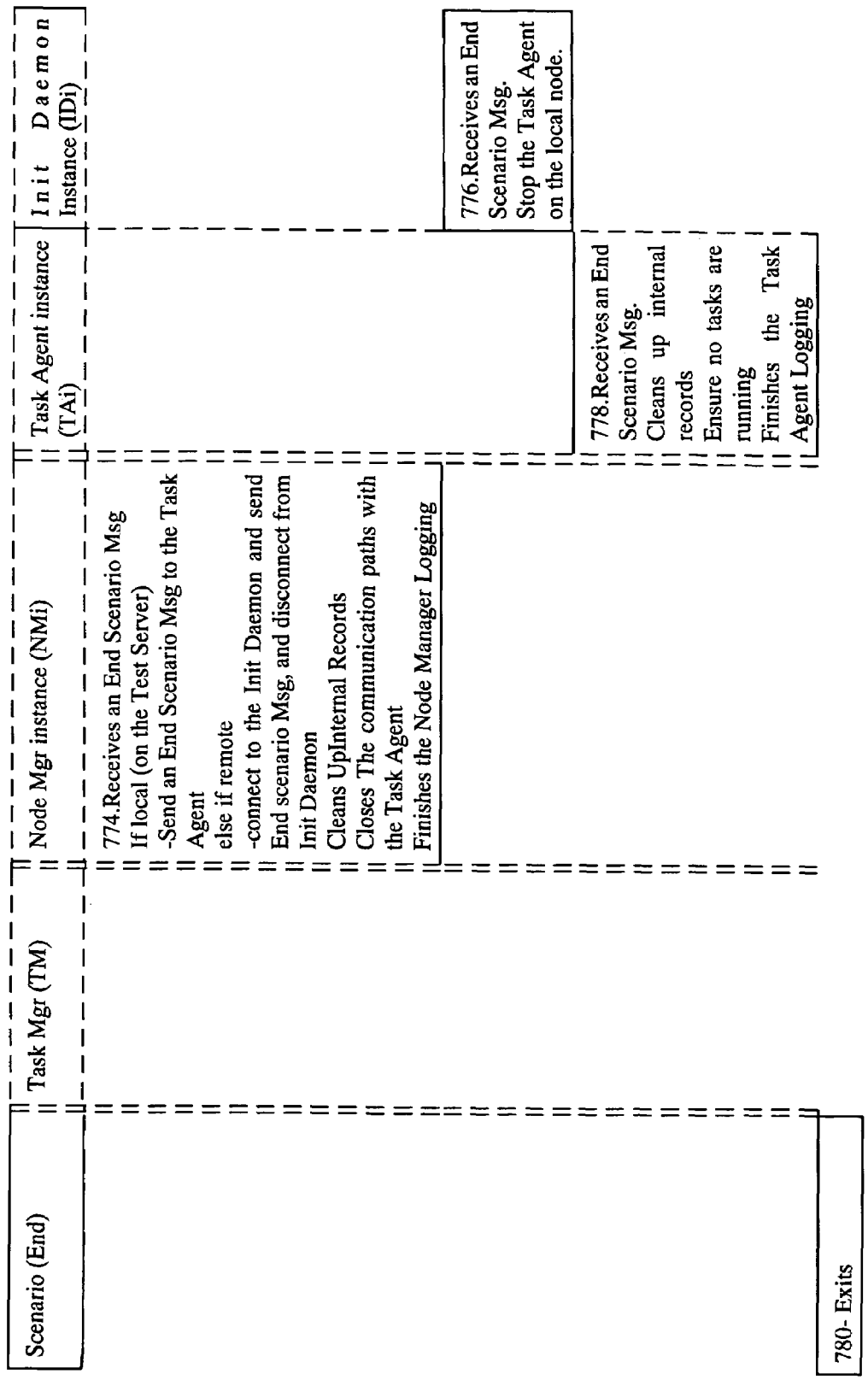
FIG. 10B is the continuation of the flow chart of FIG. 10A.

FIGS. 10A and 10B represent a flow-chart illustrating the end of the scenario. At operation 770, the scenario process finishes the logging. It then sends an end scenario message to and closes communication paths with the task manager (TM). At operation 772, the Task manager (TM) receives the end scenario message and sends an end scenario message to each node manager instance (NM). It also cleans up the internal records in its database DTM, closes the communication paths with the node managers and finishes the task manager logging.

At operation 774, node manager instances receive the end scenario messages. If the task agent managed by a node manager instance is in the test server (local), the node manager instance sends directly an end message to the task agent. If the task agent managed by a node manager instance is in a remote node, and in case of an Init daemon instance in this node, the node manager instance connects to the Init Daemon instance and sends to it an end scenario message before disconnects from it. The node manager instance cleans up its internal records, closes the communication paths with the task agent instance. It also finishes the node manager logging. At operation 776, the Init Daemon instance receives an end scenario message from the node manager instance and sends an end scenario message to the task agent instance on the node. At operation 778, the task agent instance receives the message, cleans up its internal records, ensures that no tasks are running and finishes the Task agent logging. The scenario process is thus finished at operation 780.

As an example only, flow-charts of FIGS. 7A, 7B and of FIGS. 10A and 10B illustrate the use of a Init Daemon instance as a remote access service. As seen, this Init Daemon instance is optional if the operating system on the node supports a remote access service. In this case, in FIG. 7A, the node manager instance establishes a connexion with the node using the remote access service and creating the mount point. The node manager instance then copies the task agent script on the remote node and sends a command to start the script which creates the corresponding task agent instance. The communication between the node manager instance and the task instance is enabled.

Advantageously, the invention is a task execution system providing management components in order to manage a simple or complex synchronization of tasks on different nodes of a node group. Moreover, the task execution system of the invention provides tools to build task scenario process defining the complex synchronization of tasks.

This invention also encompasses embodiments in software code, especially when made available on any appropriate computer-readable medium. The expression "computer-readable medium" includes a storage medium such as magnetic or optic, as well as a transmission medium such as a digital or analog signal.

The invention covers a software product comprising the code for use in the task execution system.

The invention is not limited to the hereinabove features of the description.

Exhibit A

A1 Synchronization API

A1-1 HM-Run (node, task, task-args, sync-flag, ha-flag)
A1-2 HM-RunWhen (taskIDList, ConditionList, node, task, task-args, ha-flag)
A1-3 HM-RunUntil (node, task, task-args, taskIDList, ConditionList, ha-flag)
A1-4 HM-RunWhenUntil (TaskIDListStart, conditionListStart, node, task, task-args, TaskIDListFinish, conditionListFinish, ha-flag)
A1-5 HM-RunUntilLast (node, task, task-args, ha-flag)
A1-6 HM-RunWhenever (taskIDList, ConditionList, node, task, task-args, ha-flag)
A1-7 HM-BRunWhen (condExpr, node, task, task-args, ha-flag)
A1-8 HM-BRunUntil (node, task, task-args, condExpr, ha-flag)
A1-9 HM-BRunWhenUntil (condExprStart, node, task, task-args, condExprFinish, ha-flag)
A1-10 HM-RunWhenever (condExpr, node, task, task-args, ha-flag)

Exhibit B

B1 Scenario Example

B1-1 Scenario Initialization
Set result [HM-InitScenario]
If {$result==−1}{
HM-NotifyScenarioResult"Unresolved"
HM-EndScenario
}
B1-2 Start Logging
set scenarioName"Scenario1"
HM-StartLogging "Scenario1"
B1-3 Initialization of tasks to be run using synchronization API
HM-Run(Node 1, A)
HM-Run(Node 2, B)
HM-RunWhen(B=FINISHED, Node 3, C)
B1-4 Start of tasks
HM-MonitorTasks( )
B1-5 Scenario result
HM-NotifyScenarioResult "passed"
B1-6 Finish Logging
HM-FinishLogging
B1-7 End Scenario
HM-EndScenario B2 Task Example B2-1 Task specific procedures
proc <FunctionName>{}{
HM-NotifyCondition"STARTED"
HM-NotifyCondition"FINISHED"
return 0
}
B2-2 Task Inialization
set taskName"task1"
set result[HM-InitTask]
if {$result==−1}{
HM-Log"error""initializing function $taskname"
HM-notifyTaskResult"UNRESOLVED"
HM-Endtask
B2-3 Block Waiting for the signal to begin
Set ProcID[HM-WaitForSignal]
B2-4 Start logging
HM-StartLogging"Task"$taskName $procID
B2-5 User specific part
set result[<functionName>]
if}$result==−1}{
HM-NotifyTaskResult"FAILED"
}else{
HM-NotifyTaskResult"PASSED"
{
B2-6 Block waiting for the signal to finish
HM-WaitForSignal
B2-7 Stop Logging
HM-FinishLogging
HM-EndTask

The invention claimed is:

1. A testing framework, comprising:
a first computer system comprising a processor, adapted for communication with nodes in a distributed node environment,
first code, executed by the processor, capable of creating a task manager,
second code, executed by the processor, adapted for defining tasks, including test tasks,
third code, wherein the third code is an executable instance executed by the processor and configured to instantiate a task agent,
test related data,
a test launcher capable of interacting with said first code for starting the task manager in said first computer system, of delivering test related data to said task manager, and, upon the sending of the third code to remote nodes, capable of requesting the starting of one or more task agents on said remote nodes,
the task manager responding to the test related data for providing said one or more task agents with said test related data, said one or more task agents responding to said test related data for retrieving respective tasks available in the second code, said task manager being capable of thereafter monitoring the execution of such tasks.

2. The testing framework of claim 1, wherein the first code is further capable of creating a node manager for a remote node under control of the task manager, the node manager being capable of requesting to an initialization daemon in this remote node, the creation of a task agent in this remote node.

3. The testing framework of claim 2, wherein the node manager is adapted to monitor a given remote node.

4. The testing framework as claimed in claim 2, wherein the task manager is further adapted to send the test related data to the node manager, the node manager being adapted to send the test related data to the task agent.

5. The testing framework as claimed in claim 1, wherein the task agent is adapted to create, in its node, a task instance in a waiting to start state.

6. The testing framework as claimed in claim 1, wherein the test related data comprise task execution conditions, the task manager being adapted to exchange synchronization messages with task agents responsive to said task execution conditions, the task manager thus monitoring the synchronization of the task instance executions.

7. The testing framework of claim 6, wherein said synchronization messages comprise a "start" message to be sent to the task agent, with the task agent staffing the execution of a corresponding task instance.

8. The testing framework of claim 7, wherein said synchronization messages comprise a "stop" message to be sent to the task agent, with the task agent stopping the execution of a corresponding task instance.

9. The testing framework of claim 7, wherein responsive to its staff, the task instance is adapted to send a "started" state message to the task manager.

10. The testing framework as claimed in claim 8, wherein responsive to the end of its execution, the task instance is adapted to send a "finished" state message to the task manager.

11. The testing framework system as claimed in claim 8, wherein responsive to its staff or to the end of its execution, the task instance is adapted to send a user defined message to the task manager.

12. The testing framework as claimed in claim 9, wherein the task instance is adapted to send the "staffed" state message or a user defined message with a task time-out to the task agent adapted to monitor said task time-out.

13. The testing framework as claimed in claim 10, wherein responsive to the "finished" state message or responsive to a user defined message from the task received before a task time-out is reached, the task agent is adapted to delete the task time-out or send a task time-out error message to the task manager.

14. The testing framework as claimed in claim 2, wherein the node manager is adapted to detect a node state change and to send a node state change message to the task manager.

15. The testing framework as claimed in claim 2, wherein the task manager is adapted to store the test related data and to update said test related data according to received messages.

16. The testing framework as claimed in claim 1, wherein the task manager is further adapted to send messages and task results to a test in execution, said test comprising the first code and a plurality of tasks defined by the second code and by the test related data.

17. The testing framework of claim 16, wherein the task manager is further adapted to monitor a time-out relative to the execution of the test.

18. The testing framework as claimed in claim 1, wherein the test launcher is adapted to start a series of tests comprising the first code and a plurality of tasks defined by the second code and by the test related data.

19. The testing framework as claimed in claim 1 any of the preceding claims, wherein the first code comprises log files, wherein the task manager creates a log manager adapted to create the log files for task results in a directory structure.

20. The testing framework as claimed in claim 1, wherein the second code comprises templates adapted for a user to build configuration files, tasks, and a test comprising the first code.

21. The testing framework as claimed in claim 1, wherein the first computer system comprises environment development tools adapted for a user to create a package comprising user defined tests and adapted to install such a package on any distributed node environment.

22. The testing framework as claimed in claim 1, wherein the first computer system comprises a fourth code capable of analyzing the task results in order to provide a test result.

* * * * *

UNITED STATES PATENT AND TRADEMARK OFFICE
CERTIFICATE OF CORRECTION

PATENT NO. : 7,702,766 B2  Page 1 of 1
APPLICATION NO. : 10/867182
DATED : April 20, 2010
INVENTOR(S) : James G. Weir et al.

It is certified that error appears in the above-identified patent and that said Letters Patent is hereby corrected as shown below:

Column 19 (line 16), please replace the word "staffing" with -- starting --;

Column 19 (line 23), please replace the word "staff" with -- start --;

Column 19 (line 29), please delete "system";

Column 19 (line 30), please replace the word "staff" with -- start --;

Column 19 (line 34), please replace the word "staffed" with -- started --;

Column 20 (line 22), please delete "any of the";

Column 20 (line 23), please delete "preceding claims".

Signed and Sealed this

Twenty-fourth Day of August, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,702,766 B2 | Page 1 of 2 |
| APPLICATION NO. | : 10/867182 | |
| DATED | : April 20, 2010 | |
| INVENTOR(S) | : James G. Weir et al. | |

It is certified that error appears in the above-identified patent and that said Letters Patent is hereby corrected as shown below:

On sheet 6 of 13, in Figure 6, Box 52, line 7, delete "synchronisation" and insert -- synchronization --, therefor.

In column 1, line 22, delete "incrisingly" and insert -- increasingly --, therefor.

In column 2, line 29, delete "begining" and insert -- beginning --, therefor.

In column 2, line 32, delete "begining" and insert -- beginning --, therefor.

In column 3, line 24, delete "incrisingly" and insert -- increasingly --, therefor.

In column 7, line 1, after "the" delete "the". (Second Occurrence)

In column 7, line 17, delete "initialises" and insert -- initializes --, therefor.

In column 8, line 58, delete "begining" and insert -- beginning --, therefor.

In column 9, line 25, delete "implicitely" and insert -- implicitly --, therefor.

In column 14, line 10, delete "FIG. 9A and 9B" and insert -- FIGS. 9A and 9B --, therefor.

In column 16, line 11, delete "wtih" and insert -- with --, therefor.

In column 16, line 53, delete "of a" and insert -- of an --, therefor.

In column 18, line 12, delete "Inialization" and insert -- Initialization --, therefor.

In column 18, line 21, delete "logging" and insert -- Logging --, therefor.

Signed and Sealed this
Nineteenth Day of April, 2011

David J. Kappos
*Director of the United States Patent and Trademark Office*

CERTIFICATE OF CORRECTION (continued)
U.S. Pat. No. 7,702,766 B2

In column 19, line 1, in claim 4, delete "claim 2 , wherein" and insert -- claim 2, wherein --, therefor.

In column 19, line 23, in claim 9, delete "a"started"" and insert -- a "started" --, therefor.

In column 19, line 27, in claim 10, delete "a"finished"" and insert -- a "finished" --, therefor.

In column 19, line 38, in claim 13, delete "the"finished"" and insert -- the "finished" --, therefor.